Dec. 31, 1929.      R. E. KIRN      1,741,849
PISTON RING
Filed Aug. 31, 1929
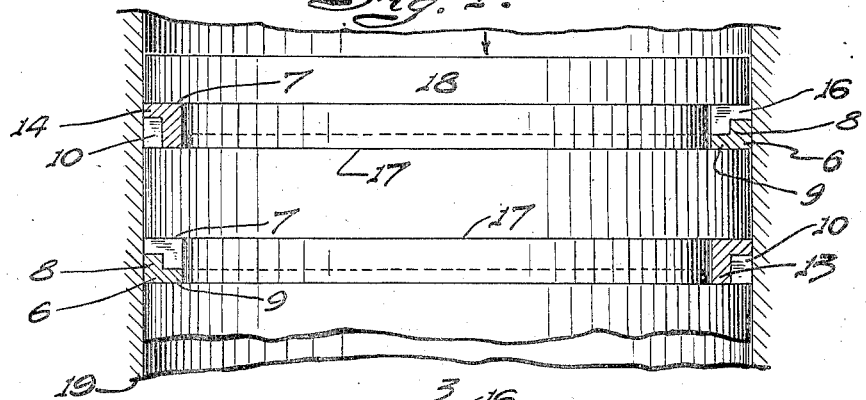
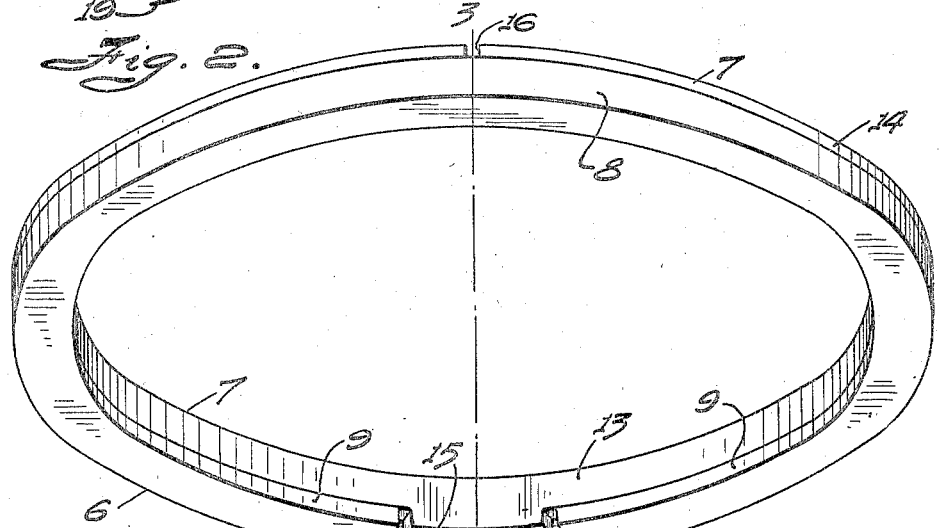
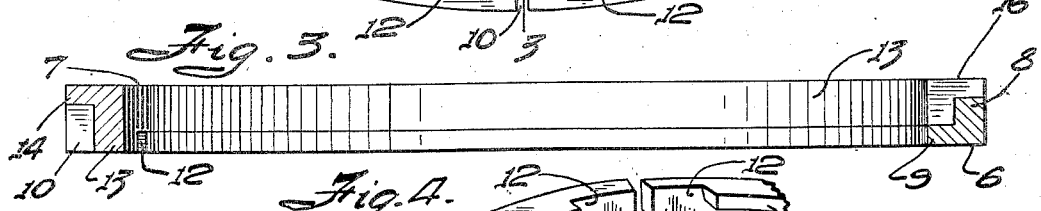
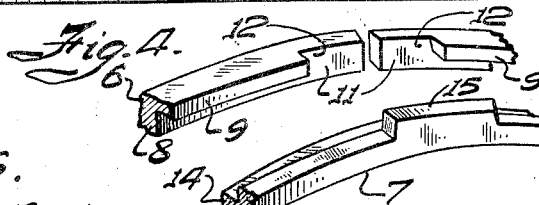
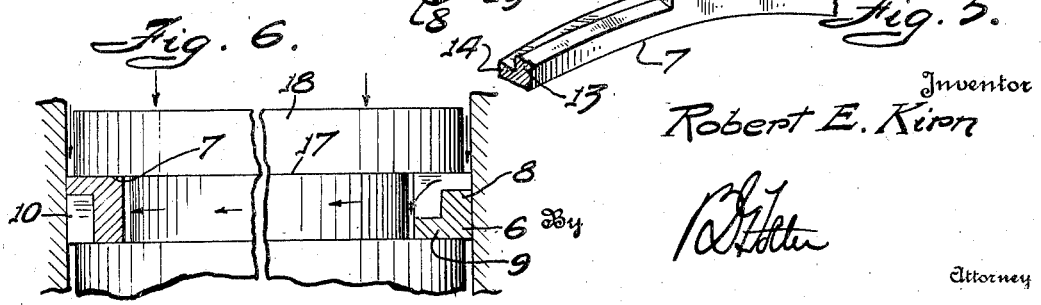
Inventor
Robert E. Kirn
By
Attorney Patented Dec. 31, 1929

1,741,849

UNITED STATES PATENT OFFICE

ROBERT E. KIRN, OF NEW YORK, N. Y.

PISTON RING

Application filed August 31, 1929. Serial No. 389,754.

The primary object of the present invention is to provide a packing ring of novel construction and involving cooperating members so constructed and related that fluid under pressure is admitted and maintained behind the ring in order to set the same against the cylinder wall and thereby form an effective seal, the members of the ring assembly being so constructed that in cross section they have equal strength and this strength is sufficient to prevent the outer member being bulged outwardly into the cylinder ports, due to the difference in pressure, as the ring passes or registers with such ports, the inner ring member furthermore having an unjointed pressure bearing the full width of the ring assembly and upon the surface against which it rests.

An embodiment of the invention that is at present considered the preferable one is illustrated in the accompanying drawings, wherein:

Figure 1 is a longitudinal sectional view through a portion of a cylinder showing a piston therein and illustrating the packing rings in place.

Figure 2 is a perspective view of the packing ring complete.

Figure 3 is a sectional view on the line 3—3 of Figure 2.

Figure 4 is a detail perspective view of the portion of the packing ring member having the joint.

Figure 5 is a detail perspective view of the portion of the expansion ring that seals the joint.

Figure 6 is a detail sectional view illustrating the manner in which the fluid under pressure finds entrance behind the ring and is retained thereby.

In the embodiment disclosed, the ring consists of two spring ring members, an outer packing ring member 6 and an inner expansion ring member 7. These members are of equal cross sectional strength and are shown in the present construction as of equal cross sectional size though the latter is not essential to that end.

The packing ring member 6 is a split ring and comprises a body 8 having an inwardly extending annular flange 9 on its lower portion. The split or joint of this ring is shown at 10 and the flange terminates at both ends short of said split or joint, so that the terminals 11 of the body of the ring on opposite sides of the split are unflanged, forming a seat 12.

The expansion ring 7 consists of an annular split body 13 that fits inside the body 8 of the packing ring above the flange 9. This body 13 has an outstanding annular flange 14 that overlies the body 8 of the packing ring and extends the full width thereof. The body 13 is furthermore provided at its central portion with a depending tongue 15 having a height equal to the height of the flange 9 of the packing ring. This tongue fits into the seat 12 or in other words is located between the ends of the flange 9 of the packing ring and constitutes a complete seal for the same. It completely bridges the joint 16 of the expansion ring 7 and which is designated 16, is not sealed but affords a means of communication between the outer side of the ring assembly and the inner side thereof.

When the ring assembly is placed in the groove as 17 of a piston as 18, the packing ring 6 is located lowermost and with its flange provides a single piece bearing the full width of the ring. On the other hand the upper face of the expansion ring 7 likewise extends the full width of the ring assembly. The joint 16 of the expansion ring being uppermost as shown in Figures 1 and 6, it will be evident that when fluid under pressure is operating against the top of the piston as indicted in Figure 6 this fluid will find its way behind the piston and enter the joint 16 thereby finding its way behind the ring assembly and expanding the ring members to set the packing ring member against the cylinder wall and secure an effective seal. In this connection it will be noted that the fluid under pressure behind the ring assembly cannot escape from the joint 10 because said joint is sealed by the tongue 15. The strength of the two ring members is equal and is sufficient to prevent the ring being bulged into a port of the cylinder when the ring passes or registers with the same. This is an important item because the pressure behind the ring is relatively great as compared, for example, to any resistant pressure at an exhaust port. With the structure moreover there is no joint bearing of two parts on the lower side of the groove which constitutes the pressure bearing for the piston ring. Instead a single surface is provided by the lower flange face of the expansion ring. Wear is thus materially reduced and the danger of forming stepped surfaces by reason of the wear of two independent parts is avoided.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A piston ring assembly including a packing ring member, and an expansion ring member, said packing ring member comprising a split body having an annular offset flange that is cut away on opposite sides of the split leaving unflanged terminals of the body on opposite sides of the split, said expansion ring member having a split body portion extending around the inner side of the packing ring, at one side of the flange thereof and having its joint open and unsealed to form a port for the entry of fluid behind the ring assembly, said expansion ring having a depending tongue that extends between the ends of said flange the depth of the packing ring and bridges and seals the cut or joint between the unflanged terminals of the body of the packing ring to prevent the escape of fluid from behind the ring assembly.

2. In combination a packing ring member and an expansion ring member, said packing ring member comprising a split body having a lower inset bearing flange that is cut away on opposite sides of the split, leaving unflanged terminals of the body on opposite sides of the split, said expansion ring member having a split body portion extending around the inner side of the packing ring at one side of the flange thereof and having its joint open to form a passageway for the entry of pressure fluid behind the ring assembly, said expansion ring having a depending tongue that extends to the bottom of the packing ring, said tongue being located between the ends of said flange and bridging the cut or joint between the unflanged terminals of the body of the packing ring behind the same, to seal said cut or joint against the escape of fluid from behind the ring assembly.

3. In combination, a packing ring member and an expansion ring member, said packing ring member comprising a split body having a lower annular inset pressure bearing flange that is cut away on opposite sides of the split, said expansion ring member having a body portion extending around the inner side of the packing ring above the flange thereof, and having an outstanding flange that overlies the packing ring body, and being provided with an open cut constituting a port for the admission of pressure fluid behind the ring assembly, the body of said expansion ring having a depending tongue that lies between the ends of the flange of the packing ring and bridges and closes the joint or cut between the ends of the packing ring to prevent the escape of pressure fluid from behind the ring assembly at said cut or joint, said tongue being located behind the unflanged ends of the body of the packing ring.

4. In combination with a cylinder, and a piston in the cylinder having an annular groove, of a piston ring assembly in the groove comprising a split packing ring member having a peripheral bearing against the cylinder and an inset annular flange forming a pressure bearing on the bottom wall of the groove, said flange terminating on opposite sides of the split and in spaced relation thereto, and a split expansion ring member located within the packing ring member above the flange thereof and having a split flange overlying the packing ring member and having the cut substantially unobstructed to form an inlet port for pressure fluid to the groove behind the ring assembly, the body of said expansion ring having a downwardly extending tongue that is located between the ends of the flange of the packing ring member and extends to the bottom of the packing ring, sealing the joint thereof to prevent escape of pressure fluid from behind the ring assembly.

In testimony whereof, I affix my signature.

ROBERT E. KIRN.